United States Patent
Park et al.

(10) Patent No.: US 8,411,541 B2
(45) Date of Patent: Apr. 2, 2013

(54) OPTICAL RECORDING MEDIUM HAVING READ-ONLY STORAGE AREA AND WRITABLE STORAGE AREA AND RECORDING/REPRODUCING APPARATUS AND METHOD THEREFOR

(75) Inventors: In-sik Park, Suwon (KR); Jung-wan Ko, Yongin (KR); Kyung-geun Lee, Sungnam (KR); Byoung-ho Choi, Suwon (JP); Jung-kwon Heo, Seoul (KR); Byung-jun Kim, Suwon (KR); Tae-yong Doh, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 667 days.

(21) Appl. No.: 12/173,402

(22) Filed: Jul. 15, 2008

(65) Prior Publication Data

US 2008/0273440 A1 Nov. 6, 2008

Related U.S. Application Data (60) Division of application No. 11/582,466, filed on Oct. 18, 2006, now Pat. No. 7,463,566, which is a continuation of application No. 09/656,709, filed on Sep. 7, 2000, now Pat. No. 7,151, 729.

(60) Provisional application No. 60/214,734, filed on Jun. 29, 2000.

(51) Int. Cl.
G11B 7/005 (2006.01)
G11B 7/007 (2006.01)

(52) U.S. Cl. ............... 369/53.22; 369/94; 369/275.3

(58) Field of Classification Search ............... 369/84, 369/53.2, 59.25, 275.3, 275.4, 278, 44.13, 369/283, 275.1
See application file for complete search history.

(56) References Cited

U.S. PATENT DOCUMENTS

| 908,882 A | 1/1909 | Parker |
|---|---|---|
| 5,233,596 A | 8/1993 | Tani |

(Continued)

FOREIGN PATENT DOCUMENTS

| EP | 0 653 758 A2 | 5/1995 |
|---|---|---|
| EP | 0 903 561 A2 | 3/1999 |

(Continued)

OTHER PUBLICATIONS

Japanese Office Action issued on Nov. 17, 2009, in counterpart Japanese Patent Application No. 2001-198696 (10 pages, in Japanese, with complete English translation).

(Continued)

*Primary Examiner* — Hoa T Nguyen
*Assistant Examiner* — Mark Fischer
(74) *Attorney, Agent, or Firm* — NSIP Law (57) ABSTRACT

An optical recording medium having a read-only storage area and a writable storage area and a recording/reproducing apparatus and method therefor. The optical recording medium is a hybrid disc having both the read-only storage area, which is suitable for mass production of information having the same contents, and the writable storage area on which data can be recorded, updated or added at a user's option. The read-only storage area has a structure that is completely compatible with a digital versatile disc read only memory (DVD-ROM) specification, and the writable storage area is compatible with the recording/reproducing characteristics of a writable DVD specification so that an existing reproducing-only apparatus can read information from the read-only storage area, and data can be recorded in the writable storage area using an apparatus obtained by minimally changing an existing recording/reproducing apparatus while maintaining the physical recording characteristics of the existing recording/reproducing apparatus.

4 Claims, 12 Drawing Sheets

U.S. PATENT DOCUMENTS

| | | | |
|---|---|---|---|
| 5,537,387 A | 7/1996 | Ando et al. | |
| 5,596,565 A | 1/1997 | Yonemitsu et al. | |
| 5,663,946 A | 9/1997 | Ohtomo et al. | |
| 5,684,785 A | 11/1997 | Itami et al. | |
| 5,732,065 A | 3/1998 | Braat et al. | |
| 5,812,519 A | 9/1998 | Kawamura et al. | |
| 5,825,734 A | 10/1998 | Igarashi et al. | |
| 5,835,589 A | 11/1998 | Nakashima | |
| 5,903,531 A | 5/1999 | Satoh et al. | |
| 5,904,969 A | 5/1999 | Kamezaki et al. | |
| 5,946,286 A | 8/1999 | Bahns et al. | |
| 6,031,808 A | 2/2000 | Ueno | |
| 6,072,759 A | 6/2000 | Maeda et al. | |
| 6,160,787 A | 12/2000 | Marquardt et al. | |
| 6,177,168 B1 | 1/2001 | Stevens et al. | |
| 6,205,112 B1 | 3/2001 | Weidner | |
| 6,223,247 B1 | 4/2001 | Otsuka et al. | |
| 6,243,338 B1 | 6/2001 | Mine et al. | |
| 6,310,854 B1 | 10/2001 | Sato et al. | |
| 6,320,840 B1 | 11/2001 | Oh et al. | |
| 6,370,090 B1 | 4/2002 | Verbakel et al. | |
| 6,385,389 B1 | 5/2002 | Maruyama et al. | |
| 6,442,128 B1 | 8/2002 | Lee et al. | |
| 6,466,735 B1* | 10/2002 | Kozuka et al. | 386/353 |
| 6,469,965 B1 | 10/2002 | Horita et al. | |
| 6,678,236 B1 | 1/2004 | Ueki | |
| 6,795,381 B2 | 9/2004 | Ando et al. | |
| 7,151,729 B1 | 12/2006 | Park et al. | |
| 7,463,566 B2 | 12/2008 | Park et al. | |
| 2002/0085466 A1* | 7/2002 | Shim | 369/53.22 |
| 2002/0150032 A1 | 10/2002 | Nishiuchi et al. | |
| 2004/0095879 A1 | 5/2004 | Mons et al. | |
| 2004/0131006 A1* | 7/2004 | Hasegawa | 369/275.3 |
| 2005/0088945 A1 | 4/2005 | Nishiuchi et al. | |
| 2006/0067202 A1* | 3/2006 | Yashiro | 369/275.1 |
| 2009/0103425 A1* | 4/2009 | Park et al. | 369/275.3 |

FOREIGN PATENT DOCUMENTS

| | | | |
|---|---|---|---|
| EP | 0 908 882 A2 | | 4/1999 |
| EP | 1 006 515 | | 6/2000 |
| EP | 1 056 089 | | 11/2000 |
| GB | 2332977 A | * | 7/1999 |
| JP | 7-182218 A | | 7/1995 |
| JP | 9-55033 A | | 2/1997 |
| JP | 9-509776 A | | 9/1997 |
| JP | 10-021673 A | | 1/1998 |
| JP | 10-505188 A | | 5/1998 |
| JP | 11-66622 A | | 3/1999 |
| JP | 11-86338 A | | 3/1999 |
| JP | 11-110826 | | 4/1999 |
| JP | 11-110826 A | | 4/1999 |
| JP | 11-232836 A | | 8/1999 |
| JP | 11-250522 A | | 9/1999 |
| JP | 11-339390 A | | 12/1999 |
| JP | 2000-173172 A | | 6/2000 |
| WO | WO 96/30907 | | 10/1996 |
| WO | WO 98/31011 A2 | | 7/1998 |
| WO | WO 99/41749 | | 8/1999 |
| WO | WO 00/23990 A1 | | 4/2000 |

OTHER PUBLICATIONS

*Standard ECMA-154, Data Interchange on 90 mm Optical Disk Cartridges, Read only and Rewritable, M.O.*, Second Edition, Jun. 1994, Ecma International, Geneva, Switzerland (119 pages, note particularly pp. 37-47).

Korean Office Action issued on Oct. 30, 2002, in counterpart Korean Application No. 10-2001-0009273 (4 pages, in Korean, including complete English translation).

Chinese Office Action issued on Aug. 20, 2004, in counterpart Chinese Application No. 011179236 (11 pages, in Chinese, including complete English translation).

Malaysian Office Action dated May 25, 2006, including Malaysian Search Report dated May 24, 2006, issued in counterpart Malaysian Application No. PI 20012032 (5 pages, in English).

Partial European Search Report issued on Nov. 12, 2007, in counterpart European Application No. 1303541.5 (7 pages, in English).

U.S. Appl. No. 11/582,465, filed Oct. 18, 2006, In-sik Park et al., Samsung Electronics Co., Ltd.

U.S. Appl. No. 12/338,185, filed Dec. 18, 2008, In-sik Park et al., Samsung Electronics Co., Ltd.

Japanese Office Action issued on Jan. 4, 2011, in counterpart Japanese Application No. 2001-198696 (2 pages, in Japanese, no English translation).

ECMA: "Date Interchange on 99 mm Optical Disk Cartridges, Read only and Rewritable M.O.". Second Edition. Jun. 1994. (http://www.ecma-international.org/publications/standards/Ecam-154-htm).

European Search Report dated Nov. 13, 2007 of the European Patent Application No. 01303541.5.

U.S. Appl. No. 09/656,709, filed Sep. 7, 2000, In-Sik Park et al., Samsung Electronics Co., Ltd.

U.S. Appl. No. 11/582,465, filed Oct. 16, 2006, In-Sik Park et al., Samsung Electronics Co., Ltd.

U.S. Appl. No. 11/582,466, filed Oct. 18, 2006, In-Sik Park et al., Samsung Electronics Co., Ltd.

U.S. Appl. No. 12/019,115, filed Jan. 24, 2008, In-Sik Park et al., Samsung Electronics Co., Ltd.

U.S. Appl. No. 12/019,130, filed Jan. 24, 2008, In-Sik Park et al., Samsung Electronics Co., Ltd.

Japanese Office Action issued on Jul. 12, 2011, in counterpart Japanese Patent Application No. 2010-137415 (3 pages including an Englich translation thereof).

Japanese Office Action issued Nov. 1, 2011, in counterpart Japanese Application No. 2001-198696 (4 pp., including English translation).

Japanese Notice of Final Rejection mailed Apr. 17, 2012, issued in counterpart Japanese Patent Application No. 2010-137415; 2 pages including English translation.

* cited by examiner

OPTICAL RECORDING MEDIUM HAVING READ-ONLY STORAGE AREA AND WRITABLE STORAGE AREA AND RECORDING/REPRODUCING APPARATUS AND METHOD THEREFOR

CROSS-REFERENCE TO RELATED APPLICATIONS

This application is a division of application Ser. No. 11/582,466 filed on Oct. 18, 2006, now U.S. Pat. No. 7,463,566, which is a continuation of application Ser. No. 09/656,709 filed on Sep. 7, 2000, now U.S. Pat. No. 7,151,729, which claims the benefit of Provisional Application No. 60/214,734 filed on Jun. 29, 2000, now expired, the disclosures of which are incorporated herein by reference.

BACKGROUND OF THE INVENTION

1. Field of the Invention

The present invention relates to a recording medium having a read-only storage area and a writable storage area and a recording/reproducing apparatus and method therefor, and more particularly, to a recording medium having a read-only storage area complying with a digital versatile disc (DVD) specification and a writable storage area physically compatible with a DVD-writable specification and a recording/reproducing apparatus therefor.

2. Description of the Related Art

Generally, read-only optical recording media that are manufactured by injection molding have characteristics in that information is configured in the form of embossments referred to as pits so that user information is recorded on a mold, and the information is transferred during injection. Accordingly, read-only optical recording media are advantageous in increasing production efficiency compared to the case where information is recorded on a floppy disc or a magnetic recording medium and distributed.

However, read-only optical recording media on which users cannot record data have a problem in that data cannot be modified or added in application examples such as an encyclopedia and popular music data for accompaniment which frequently require modification of data and addition of data.

Meanwhile, among digital versatile disc specifications, read-only discs are defined in a digital versatile disc read only memory (DVD-ROM) specification (DVD Specification for read-only memory Part 1 version 1.0). Discs on which a user can record data are defined in a digital versatile disc random access memory (DVD-RAM) specification (DVD Specification for rewritable memory Part 1), in a digital versatile disc recordable memory (DVD-R) specification (DVD Specification for recordable memory Part 1), and in a digital versatile disc rewritable memory (DVD-RW) specification (DVD Specification for re-recordable memory Part 1).

However, discs having both a read-only specification and a recordable specification are not defined so that requirements for modification of data and addition of data, which are characteristics of a recordable disc, and requirements for mass copying of the same data, which is a characteristic of a read-only disc, cannot be simultaneously satisfied.

When proposing a new optical disc satisfying the above requirements, compatibility with a recording/reproducing apparatus according to a conventional specification should be considered. In other words, it is important to make a new optical disc satisfying the above requirements to be compatible with a conventional recording/reproducing apparatus which is made and performs, without consideration of a medium having the characteristics of both a recordable disc and a read-only disc.

In this case, it is apparent that complete compatibility cannot be achieved because the characteristic of a particular area on a single disc changes. Accordingly, as for compatibility, the characteristics of a read-only medium are primarily considered such that data in a read-only storage area can be reproduced in a conventional apparatus for only reproducing, and simultaneously, a writable storage area is considered to be compatible with physical recording/reproducing characteristics defined in a conventional rewritable specification taking into account the fact that data can be additionally recorded or updated in the writable storage area while a user is using a disc.

In addition, it is preferable that an optical recording medium having a read-only storage area and a writable storage area has drive compatibility with a conventional DVD-ROM drive and a conventional DVD-RAM drive.

Figure 1:
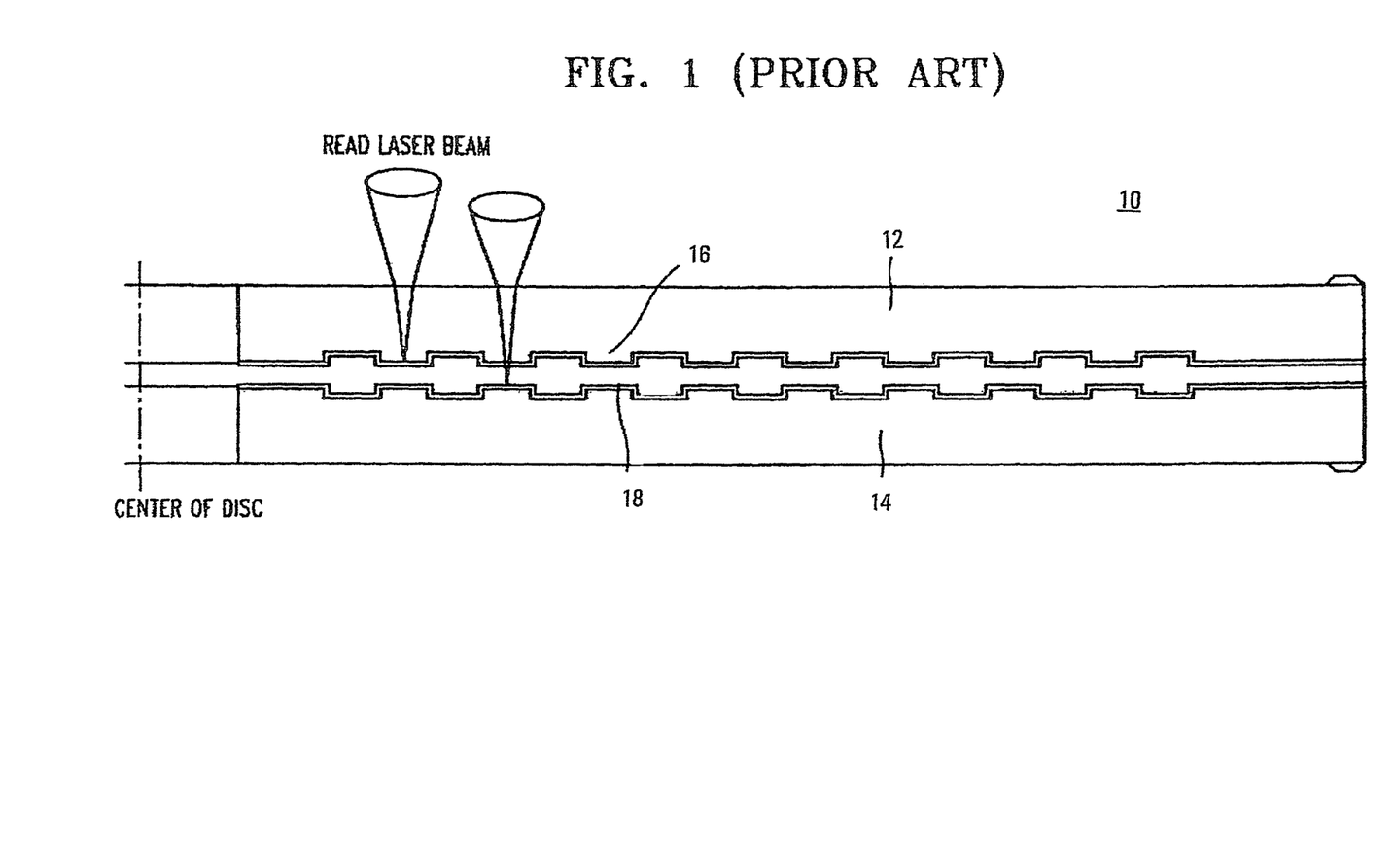
FIG. 1 is a sectional view of an optical recording medium compatible with a conventional digital versatile disc read only memory (DVD-ROM) specification.

For a clear understanding of the present invention, a structure of an optical disc (optical recording medium) defined according to a digital versatile disc read only memory (DVD-ROM) specification will be described in detail. FIG. 1 is a sectional view of a conventional dual layer optical disc 10 defined according to the DVD-ROM specification. The optical disc 10 defined according to the DVD-ROM specification comprises first and second substrates 12, 14. Information layers 16, 18 are formed on the first and second substrates 12, 14, respectively, and the first and second substrates 12, 14 are united such that the information layers 16, 18 face each other. The information layer (16 in this instance) nearer to a substrate on which a read laser beam is incident is defined as a first recording layer, and the underlying information layer (18 in this instance) is defined as a second recording layer.

Such an optical disc 10 includes a lead-in area (not show) at an innermost part of the optical disc 10 and a lead-out area (not shown) at an outermost part of the optical disc 10, or a middle area in which various control information (not shown) and information on the physical characteristics of the optical disc 10 is recorded, so that data in the inner part and the outer part can be steadily read.

Generally, a read-only optical disc is molded by injecting a polycarbonate resin material into a die, referred to as a stamper, on which information is formed in the form of embossed pits, such that the information can be transferred to the read-only disc. After forming the read-only optical disc by injection, a material such as aluminum having a characteristic of reflecting light is sputtered on an information surface to form a reflective layer.

A DVD-ROM (the optical disc 10) is formed by uniting two discs (the first and second substrates 12, 14), each of which is molded according to the above method to have a thickness of 0.6 mm, so as to have a total DVD-ROM thickness of 1.2 mm. One substrate may not have a recording layer, or each substrate may have two recording layers. In the case where each of first and second substrates 12, 14 has a single recording layer, when the optical disc is formed such that data can be read from only one side of the optical disc, the optical disc is referred to as a dual layer optical disc. When a disc is formed such that data can be read from layers on both sides of the optical disc 10, the optical disc 10 is referred to as a double sided disc.

As described above, since information is recorded on a read-only optical disc while it is being formed by injecting a polycarbonate resin material into a stamper on which information is formed, the information can be formed on the read-only optical disc in a short time as compared to a magnetic recording medium or a writable recording medium. Accordingly, the read-only optical disc is suitable for mass producing the same data, such as a film or a computer game which needs to be copied in large quantity.

Figure 2:
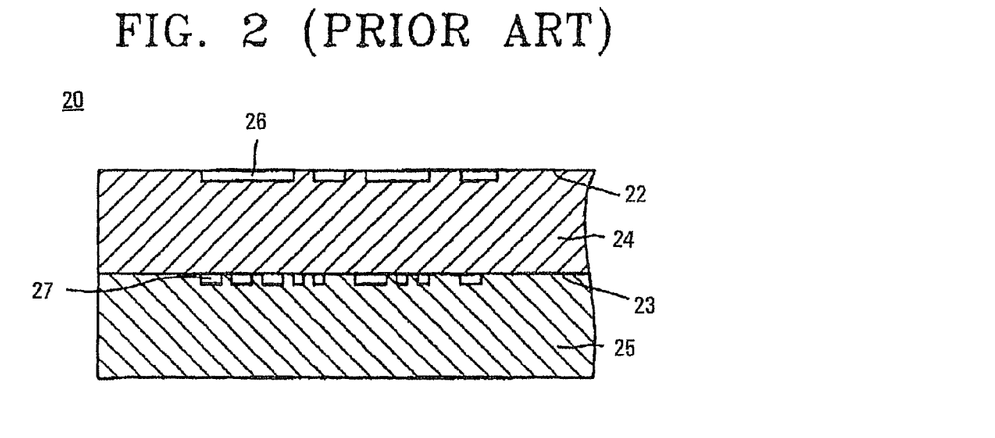
FIG. 2 is a diagram showing a structure of a conventional optical recording having two kinds of data storage areas having different characteristics.

FIG. 2 is a diagram showing a structure of a conventional optical disc recording medium 20 having two data storage areas having different characteristics. Data which can be reproduced using a laser of 780 nm is recorded in a first recording area 26 on the optical disc 20, and data which can be reproduced using a laser of 635-650 nm is recorded in a second recording area 27. Referenced numeral 22 denotes a standard density information layer for a compact disc (CD), reference numeral 23 denotes a high-density information layer for a DVD, reference numeral 24 denotes a second substrate layer, reference numeral 25 denotes a first substrate layer, reference numeral 26 denotes the first recording area which is readable using the laser of 780 nm, and reference numeral 27 denotes the second recording area which is readable using the laser of 635-650 nm. The dual layer high-density optical disc 20 of FIG. 2 is disclosed in U.S. Pat. No. 5,732,065 entitled "Optical Information Carrier Including Standard and High Density Layers" and having a filing date of Sep. 4, 1996.

Figure 3:
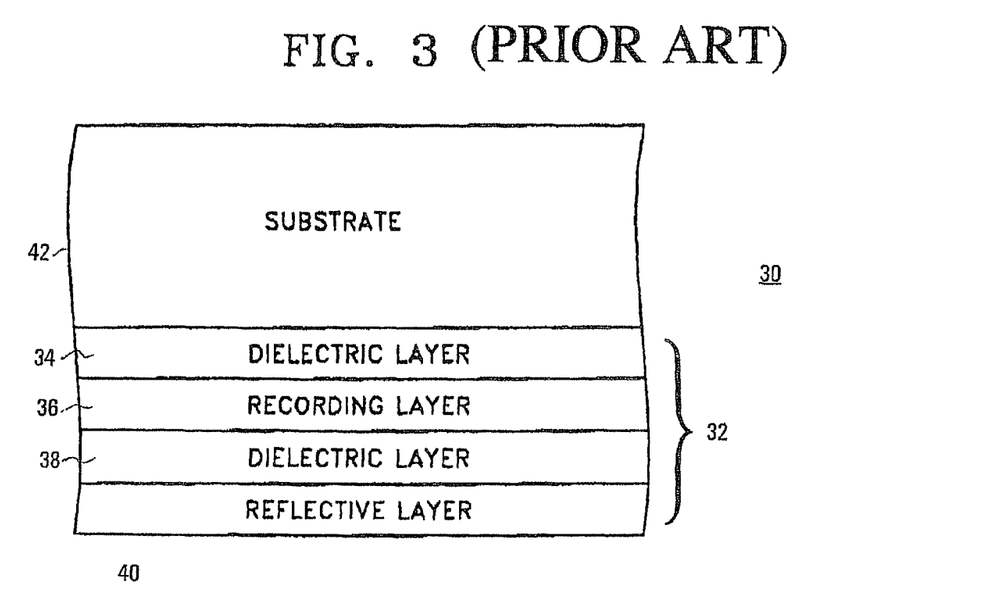
FIG. 3 is a diagram showing a structure of a conventional recording layer of a writable optical recording medium, which provides for a clear understanding of the present invention.

FIG. 3 shows a structure of a complex recording layer 32 of a typical writable, optical recording medium 30. Since user data is not recorded on a disc during manufacturing of a writable medium such as a digital versatile disc random access memory (DVD-RAM), substrates can be formed using the same stampers. Unlike a read-only medium in which a reflective layer is simply formed, a complex recording layer including a plurality of films (i.e., a dielectric layer 34, a recording layer 36, another dielectric layer 38 and a reflective layer 40 shown in FIG. 3) needs to be formed on a substrate 42 to allow a user to record data on the optical recording medium 30. A DVD-RAM or a digital versatile disc-rewritable (DVD-RW) has a complex recording layer having a multi-layered structure such that recording can be achieved using a change in a material of the recording layer 36, that is, a change between an amorphous state and a crystalline state

SUMMARY OF THE INVENTION

To solve the above and other problems, a first object of the present invention is to provide an optical recording medium that is compatible with a digital versatile disc (DVD) specification and also has a read-only storage area and a writable storage area.

A second object of the present invention is to provide an optical recording medium which has a read-only storage area and a writable storage area, and on which control information for the writable storage area is recorded in the read-only storage area so that the optical recording medium can be compatible with a DVD specification.

A third object of the present invention is to provide a recording/reproducing apparatus for an optical recording medium that is compatible with a DVD specification and also has a read-only storage area and a writable storage area.

In order to achieve at least the first and second objects, the present invention provides an optical recording medium comprising a substrate; a read-only storage area at an inner part of the substrate; and a writable storage area at an outer part of the substrate.

To achieve at least the third object of the present invention, there is provided an apparatus for recording/reproducing data onto/from an optical recording medium having a read-only storage area at an inner part of a substrate and a writable storage area at an outer part of the substrate, the apparatus comprising a system controller which generates identification information for indicating that the optical recording medium is a hybrid disc having the read-only storage area and the writable storage area; and a recording unit which records the data of the read-only storage area, which is updated for use by correction, modification and addition, in the writable storage area, and the generated identification information in the lead-in area of the read-only storage area.

Preferably, the recording/reproducing apparatus further comprises a reproducing unit which reproduces data from the optical recording medium by controlling a reference linear velocity for reproduction at the read-only storage area to be the same as a reference linear velocity at the innermost part of the writable storage area.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

When an optical recording medium (hereinafter, referred to as a hybrid disc) having both a read-only storage area and a writable storage area, which are defined in a DVD specification, is defined under the situation that conventionally, individual DVD specifications for a read-only medium and a writable medium exist, compatibility of the specification for the hybrid disc with the conventional specifications becomes a problem as described before. The term "writable" may indicate "recordable" for a DVD-R, "rewritable" for a DVD-RAM and "re-recordable" for a DVD-RW.

A recording medium having a ROM and a RAM area is mainly used for supplying the same content in bulk by taking advantage of easy duplication, which is the characteristic of a read-only medium. Accordingly, the read-only storage area needs to be primarily considered in solving a compatibility problem.

In addition, since a physical space on a disc is divided such that a specific space is assigned as a read-only storage area, and another specific space is assigned as a writable storage area, the physical characteristics of a space on a hybrid disc are different from those of a space on a disc having only one kind of storage area. Accordingly, it is apparent that the specification for the hybrid disc cannot be completely compatible with conventional specifications.

In this specification, as for the compatibility, it is preferable that the read-only storage area has a compatibility such that data in the read-only storage area can be reproduced in a conventional reproducing apparatus, and a writable storage area is compatible with the recording/reproducing characteristics of a conventional writable medium such that additional circuits necessary for implementing a recording/reproducing apparatus for recording, modifying or reproducing data on the writable storage area can be minimized. By doing this, user data stored in the read-only storage area can be reproduced in a conventional reproducing apparatus at least so that the hybrid disc can be used for the same usage as that of a conventional DVD-ROM. In addition, a recording/reproducing apparatus for the hybrid disc according to the present invention can modify data stored in the read-only storage area or add new data to the data stored in the read-only storage area, thereby securing compatibility of the hybrid disc with a conventional DVD reproducing apparatus.

Figure 4:
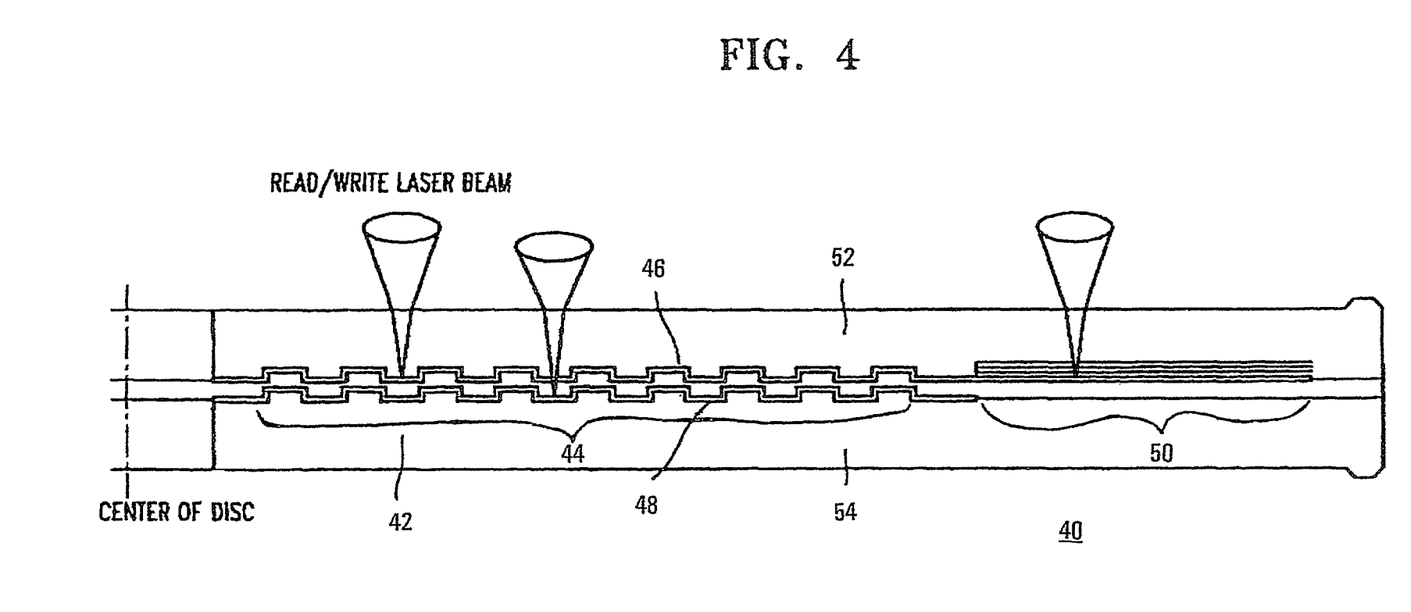
FIGS. 4 through 9 are examples of structures of embodiments of an optical recording medium having a read-only storage area and a writable storage area according to the present invention.

A first embodiment which considers the requirements for such compatibility is shown in FIG. 4. In this diagram, a portion of a hybrid disc 40 is shown, wherein a data area 42, in which user data can be prerecorded according to a conventional DVD-ROM specification, has a start diameter of 48 mm indicating the beginning of the data area and a maximum diameter of 116 mm (in the case of a disc having a diameter of 120 mm) or 76 mm (in the case of a disc having a diameter of 80 mm). In other words, the start diameter is predetermined, but the end diameter of the data area is not fixed to a certain value. A range is given for the end diameter.

Accordingly, the start diameter of the data area is set to 48 mm, and the end diameter of the data area is set to be larger than 48 mm and smaller than 116 mm in the case of an optical disc having a diameter of 120 nm (or 76 mm in the case of an optical disc having a diameter of 80 mm), and a writable storage area is defined in the remaining area other than an information area for recording control information among the area in which read-only data is not recorded, thereby obtaining optimal compatibility with a conventional DVD-ROM.

When considering the fact that a recording area is divided into a plurality of zones using a zoned continuous linear velocity (ZCLV) method in a DVD-RAM, it is preferable to assign at least an area corresponding to the size of a single zone defined in a DVD-RAM specification for the writable storage area.

In the case of the conventional DVD-RAM, various control information, such as the rotation speed of a disc and defect management information, are closely related to the size and the location of a zone. In particular, the rotation speed of the DVD-RAM is not only connected with a zone but also closely related to the recording characteristics of such a phase-change recording medium. Accordingly, to be compatible with the physical recording characteristics of the conventional DVD-RAM, it is preferable to consider size and location in the assignment of zones when the read-only storage area and the writable storage area are defined on the hybrid disc of the present invention.

In addition, the conventional DVD-ROM specification defines a dual layer disc. Accordingly, it is preferable to dispose the read-only storage area 44 defined by the dual layer DVD-ROM specification in an inner part of the hybrid disc 40 and the writable storage area of a single layer structure 50 in an outer part of the hybrid disc 40 beyond the read-only storage area 44 on the hybrid disc, as shown in FIG. 4.

Since the conventional specification for the writable storage area 50 defines only the single layer structure, it is preferable to dispose the writable storage area 50 on a first recording layer 46, LAYER 0, on a first substrate 52. This is because a heat transfer characteristic changes, and this may result in a change in a recording characteristic in a writable medium including a recording layer having a multi-layer structure when the order of a substrate on which the recording layer is formed and a plurality of layers included in the recording layer, changes in view of an incident laser beam.

The structure of the hybrid disc 40 shown in FIG. 4 defines a dual layer read-only storage area 44, thereby realizing a capacity of 4.7 Gbytes, which is the size of the most widely used DVD-ROM, by applying the dual layer read-only storage area 44, while including the writable storage area 50.

Figure 5:
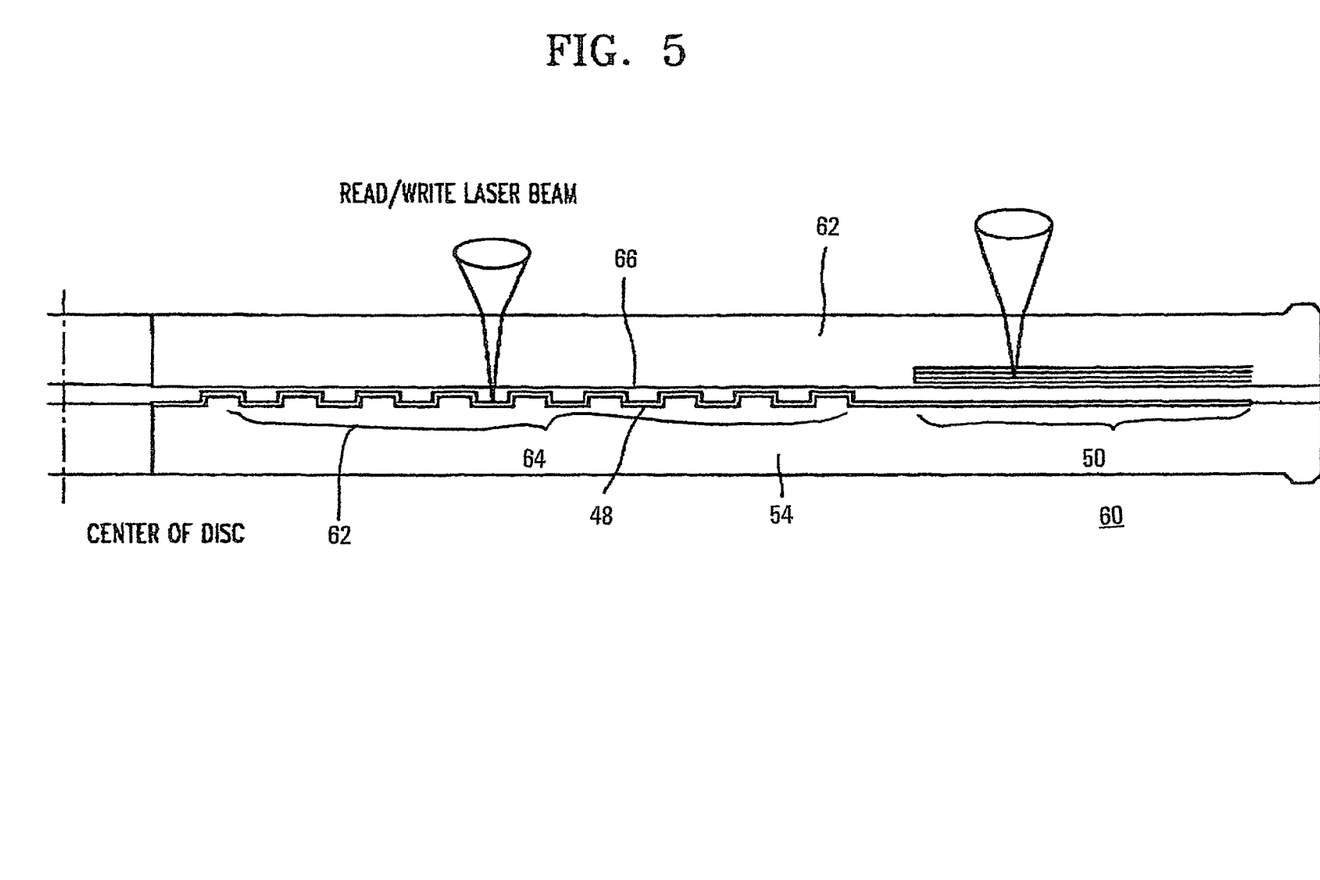

FIG. 5 illustrates a second embodiment of the optical recording medium according to the present invention wherein a hybrid disc 60 is shown. A first substrate 62 has a transparent area 66 without having any storage area at its inner part and the writable storage area 50 at the outer circumference thereof. Meanwhile, the second substrate 54 has the recording layer 48, LAYER 1, in a read-only storage area 64 at its inner part, which is spatially separated from the writable storage area 50 of the first substrate 62.

The two optical recording media, i.e., the second substrate 54 having the read-only storage area 64, and the first substrate 62 having the writable storage area 50, are combined with each other, thereby forming an optical recording medium 60 having both the read-only storage area 64 and the writable storage area 50. As for the present embodiment of the optical recording medium, a writable medium manufacturing process and a read only medium manufacturing process can be applied separately, and different stampers (not shown) can be used in manufacturing the second substrate 64 having the read-only storage area 64 and the first substrate 62 having the writable storage area 50. For this reason, even if the content of data to be written onto the read-only storage area 64 is changed, there is no need to change the stamper for the writable medium (the first substrate 62). On the other hand, an advantage in view of the read only medium, is that it is unnecessary to form a recording layer.

Also, the hybrid disc 60 as shown in the second embodiment in FIG. 5 enables a read only disc manufacturer to produce a recording medium having a writable storage area and a read-only storage area by simply combining a medium having a writable storage area, which is commercially available, with a medium having a read-only storage area produced by the manufacturer.

Figure 6:
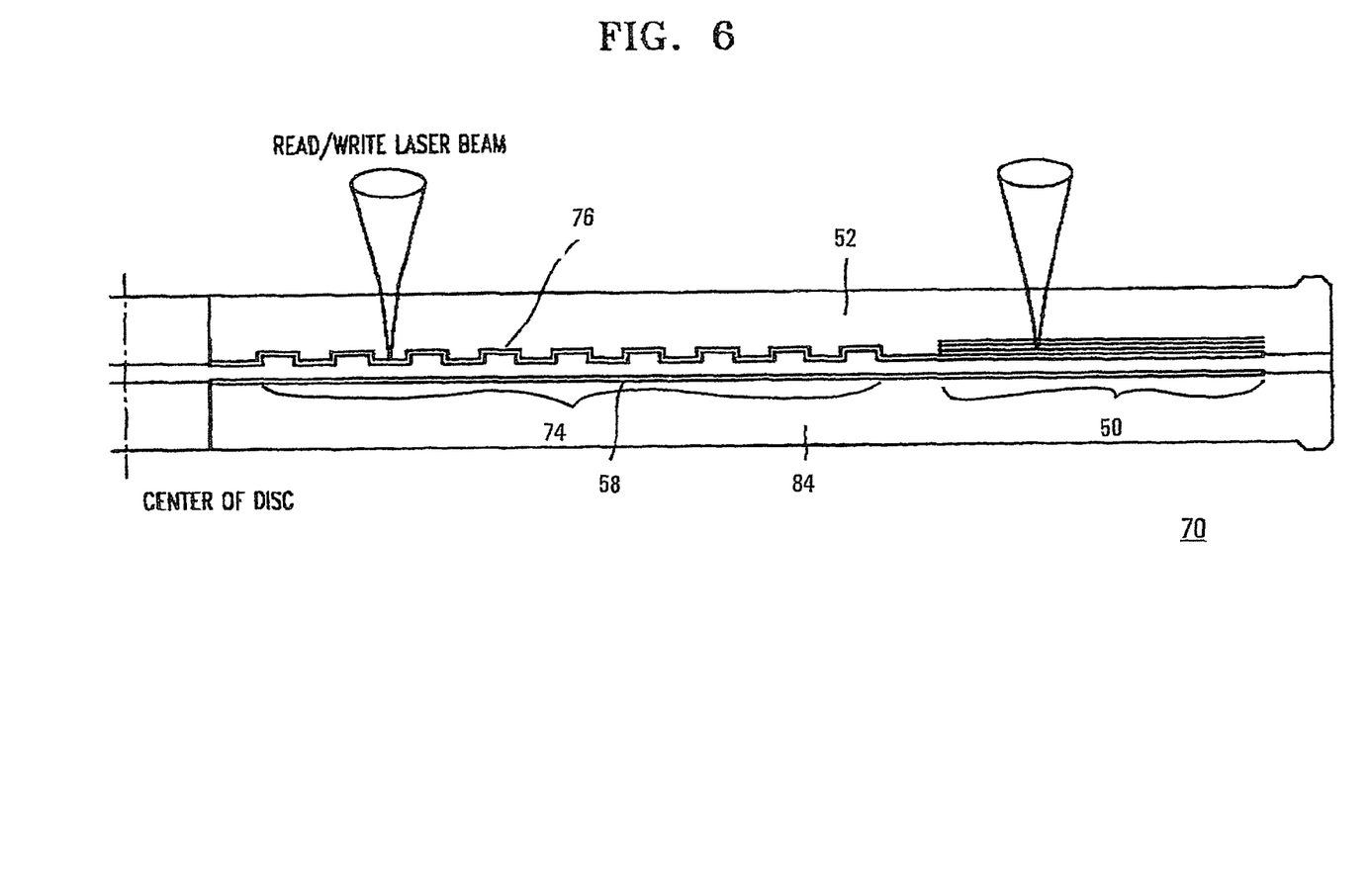

FIG. 6 illustrates a third embodiment of the optical recording medium according to the present invention, wherein a hybrid disc 70 is shown. The hybrid disc 70 has a single read-only storage area 74 at its inner part and a writable storage area 50 at its outer part. Thus, the hybrid disc 70 having the read-only storage area 74 and the writable storage area 50, which have different features, can be implemented with a single substrate, which is a first substrate 52.

To avoid the read-only storage area 74 from being exposed during the formation of a recording layer 76 in a writable storage area 60, the read-only storage area 74 is covered with a mask (not shown) during formation of the recording layer 76 in the writable storage area 50, and the mask is removed before formation of an outermost reflective layer (not shown) of the hybrid disc 70, so that the hybrid disc 70 can be constructed. A second substrate 84 has a dummy recording layer 58 in both the read-only storage area 74 and the writable storage area 50, so that no data is recorded on the entire dummy recording layer 58 The hybrid disc having both a read-only storage area and a writable storage area 50 can be produced through such successive processes using a single stamper.

Figure 7:
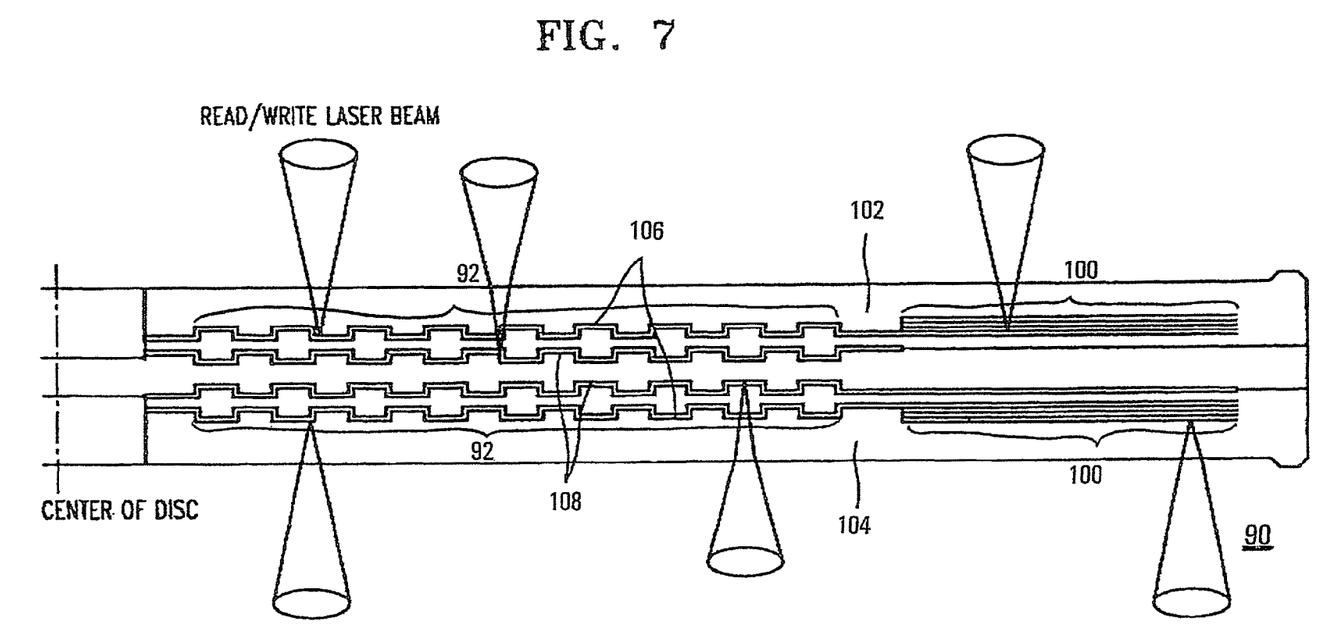

FIG. 7 illustrates a fourth embodiment of the optical recording medium according to the present invention, showing a hybrid disc 90, in which a dual layered read-only storage area 92 is formed at the inner part of each of the first and second substrates 102 and 104 by a two photo polymerization (2P) technique, and a writable storage area 100 adopting a DVD-RAM format and having the recording/reproducing characteristics defined by a DVD-RAM format, is formed at the outer part of each of the first and second substrates 102 and 104. For this case, writing or reading data onto or from the first and second recording layers 106 and 108, LAYER 0 and LAYER 1, formed at the first substrate 102 is performed through an incident side of entrance on the hybrid disc 90 of a laser beam of the first substrate 102. Also, writing or reading data onto or from the first and second recording layers 106 and 108, LAYER 0 and LAYER 1, formed at the second substrate 104 is performed through an incident side of entrance on the hybrid disc 90 of a laser beam of the second substrate 104. In the hybrid disc 90 having such a structure, formation of the recording layer at a portion of the storage area may be omitted. For example, the first substrate 102 may have a single layered read-only storage area or the second substrate may have no writable storage area.

Figure 8:
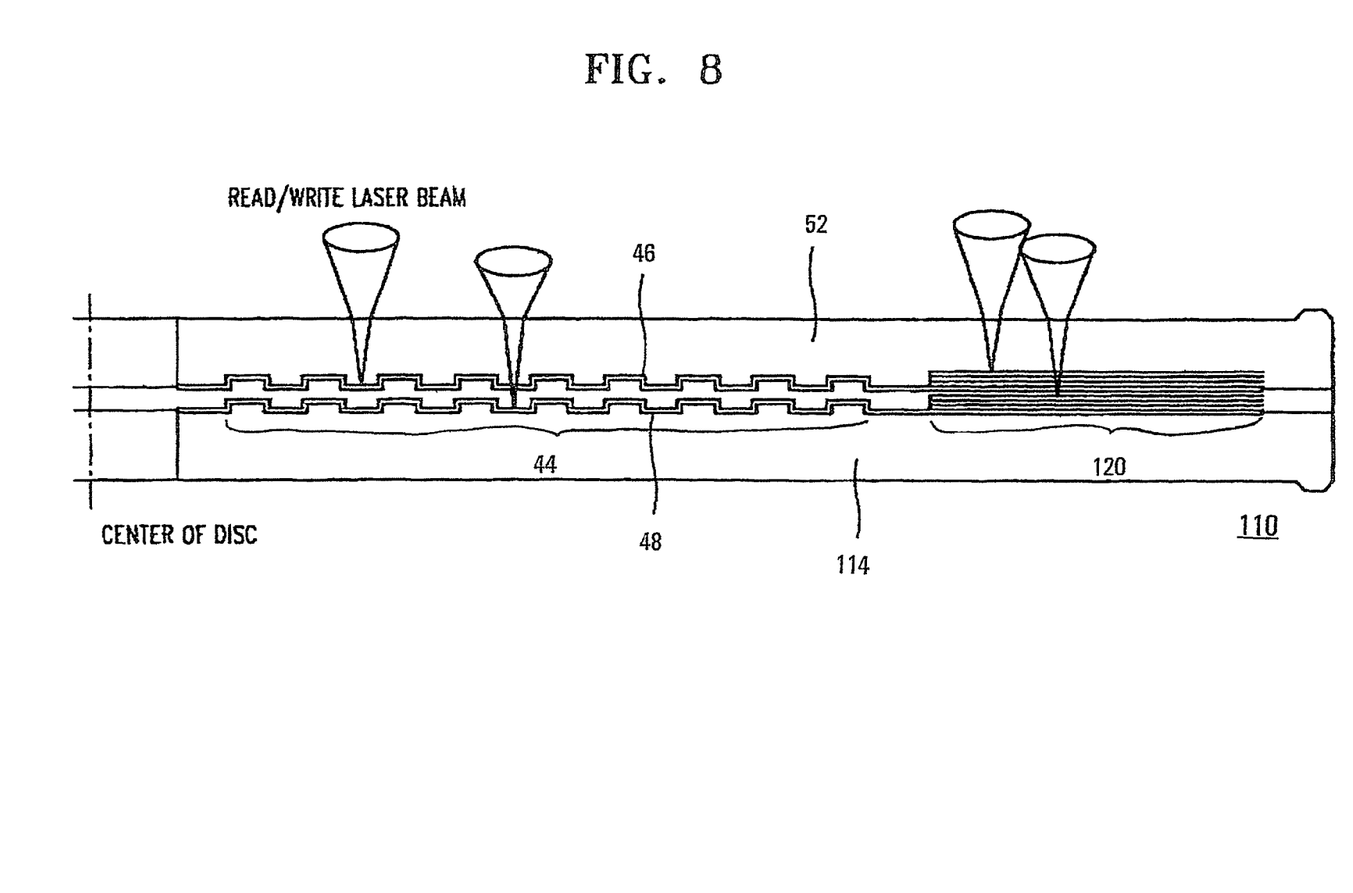

FIG. 8 illustrates a fifth embodiment of the optical recording medium according to the present invention, wherein a hybrid disc 110 is shown. The structure of the hybrid disc 110 is the same as that shown in FIG. 4, except that the writable storage area 120 is formed with a dual layered structure (the writable storage area 120 of the first and second recording layers 46 and 48), and is arranged at the outer part of each of the first and second substrates 52 and 114. As shown in FIG. 8, writing and reading operations are performed through the incident side of the first substrate 52. For this case, recording/reproducing characteristics in the dual layered structure are different from those of the writable storage area having a single layered structure, so that the structure of a recording/reproducing apparatus for the optical recording medium may be complicated. Meanwhile, such a dual layered structure is advantageous due to an increased data writing capacity in the writable area.

Figure 9:
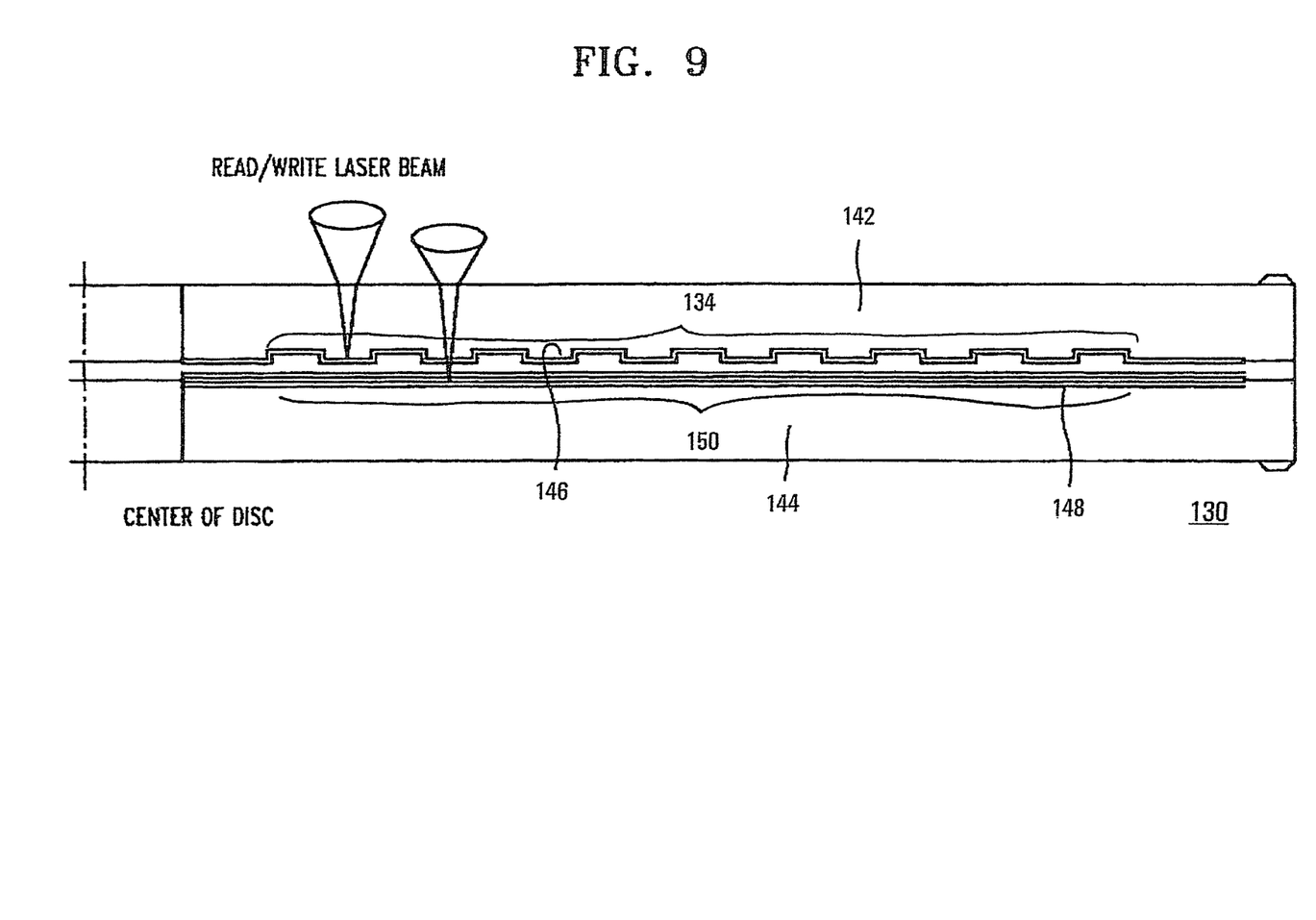

FIG. 9 illustrates a sixth embodiment of the optical recording medium according to the present invention showing a hybrid disc 130, in which a read-only storage area 134 is formed over a first substrate 142, and a writable storage area 150 is formed over a second substrate 144. The read-only storage area is formed of a first recording layer 146, LAYER 0, and the writable storage area is formed of a second recording layer 148. This configuration may lower the compatibility in reading operations with other recording media. In addition, the recording characteristics are changed and thus the compatibility in writing operations with other recording media may be lowered. Advantages of the hybrid disc 130 shown in FIG. 10 are that a writable medium and a read only medium can be separately manufactured, as described previously, and data writing capacity increases.

In the case where the writable storage area 150 is formed at the second substrate 144 and the read-only storage area 134 is formed at the first substrate 142, the hybrid disc 130 can be constructed to enable reading or writing of data from or to two recording layers through the incident side of the first substrate 142, rather than one side of the hybrid disc 130 for one layer and the other side of the hybrid disc 130 for the other layer.

On the other hand, when the writable storage area 150 is formed at the first substrate 142, the second recording layer 148 must be formed of a semi-transmissive layer, and data from the read-only storage area 134 formed at the second substrate 144 must be reproduced with a higher read power so as to compensate for reduced read laser power due to the first recording layer 146 of the first substrate 142. For this case, it is very likely that data of the first recording layer 146 will be erased or changed by interference. The configuration shown in FIG. 9 contributes to minimizing such a problem with an increased writable storage area.

Figure 10:
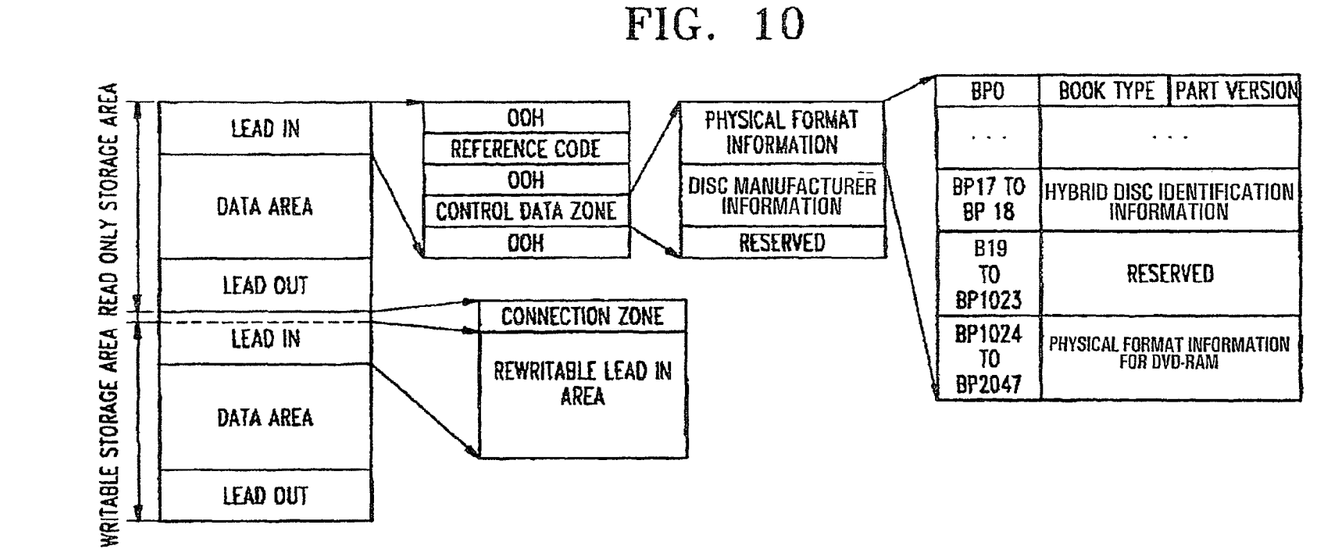
FIG. 10 is a diagram showing a control information format in a lead-in area on an optical recording medium according to the present invention.

FIG. 10 illustrates the control information for correct playback from the optical recording medium according to the first through fifth embodiments of the present invention by a recording/reproducing apparatus.

As for a hybrid disc medium having a read-only storage area and a writable storage area, as previously mentioned, the read-only storage area is constructed to have compatibility with a conventional DVD-ROM reproducing apparatus. For this case, there is no problem in using a conventional DVD reproducing apparatus. However, a disc identifier for use in distinguishing a hybrid disc from a conventional DVD-ROM is required to enable an apparatus for recording/reproducing data onto/from the writable storage area to identify the hybrid disc. The need for such identification information may be satisfied by adding particular information to the lead-in area.

To implement the compatibility with a DVD reproducing apparatus which is able to recognize only a conventional DVD-ROM, it is preferable that data writing is performed with reserved bytes, without using the physical format information of the control data zone. This is because modifying the physical format information, for example, the BP0, of the existing control data zone including book type information indicating the type of specification book, and part version information of the specification book, to be suitable for a new medium, may result in losing compatibility.

Figure 11:
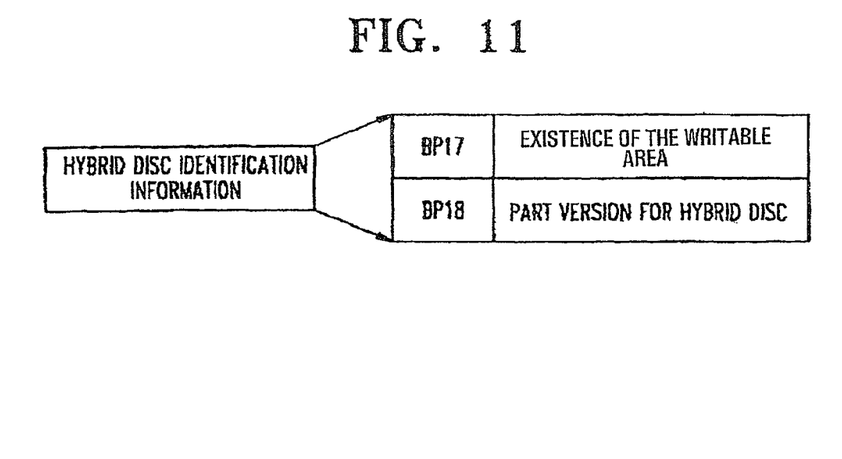
FIG. 11 is a diagram showing a structure of hybrid disc identification information of the control information shown in FIG. 10.

In particular, DVD-ROMs do not utilize the 17th through 32nd bytes of the physical format information, and thus hybrid disc identification information indicating a hybrid disc having a read-only storage area and a writable storage area can be written using some reserved bytes for other writing formats. As shown in FIG. 11, such hybrid disc identification information includes information on the presence or absence of the writable storage area, which is an indicator of the hybrid disc, and information on a part version for the hybrid disc.

Comparing the lead-in information of a DVD-ROM with the lead-in information of a DVD-RAM that is a writable medium, the lead-in information of the writable medium contains all fields of the lead-in information of the DVD-ROM. On the other hand, the lead-in information of the DVD-ROM uses only 16 bytes and the remaining bytes are reserved.

As for the writable medium, a plurality of information areas are allocated to the lead-in information for adding information on, for example, the recording characteristics of the medium. Also, the recording density belonging to the lead-in information of the DVD-RAM is constructed to be different from that of a DVD-ROM disc.

As shown in FIG. 10, when reproduction is carried out from the lead-in area of the read-only storage area, the data area of the read-only storage area, the lead-out area of the read-only storage area, and the lead-in area of the writable storage area consecutively, the data transmission rate and the rotation speed of a spindle motor are varied, thereby slowing down a data recording/reproducing speed. To solve this problem, it is preferable for the hybrid disc to store the physical format information of the control data zone for the writable storage area in the lead-in area of the read-only storage area.

For this case, the reserved bytes among 2048 bytes allocated for the physical format information of the read-only storage area, i.e., the bytes after the $1024^{th}$ byte, are used to store the physical format information for the writable storage area, and thus the storage of corresponding information in the lead-in area of a writable medium can be omitted. As a result, a delay in writing and reading operations due to the difference in transmission rate and rotation speed of a spindle motor can be avoided.

FIG. 10 shows that the control data zone of the lead-in area of the read-only storage area includes physical format information, disc manufacturer information and reserved bytes. The physical format information comprises bytes BP0 to BP2047. BP0 includes the book type (DVD-ROM disc, DVD-RAM disc) and the part version. In the present invention, the book type will be "DVD-ROM" so as to be readable by a conventional DVD-ROM player. BP0 to BP16 include physical format information for a DVD-ROM, or in this instance, the read-only storage area. BP17 to BP18 include the hybrid disc identification information as shown in FIG. 11. BP19 to BP1023 are reserved bytes. BP1024 to BP2047 are physical format information for a DVD-RAM, or in this instance, the writable storage area.

Figure 12A:
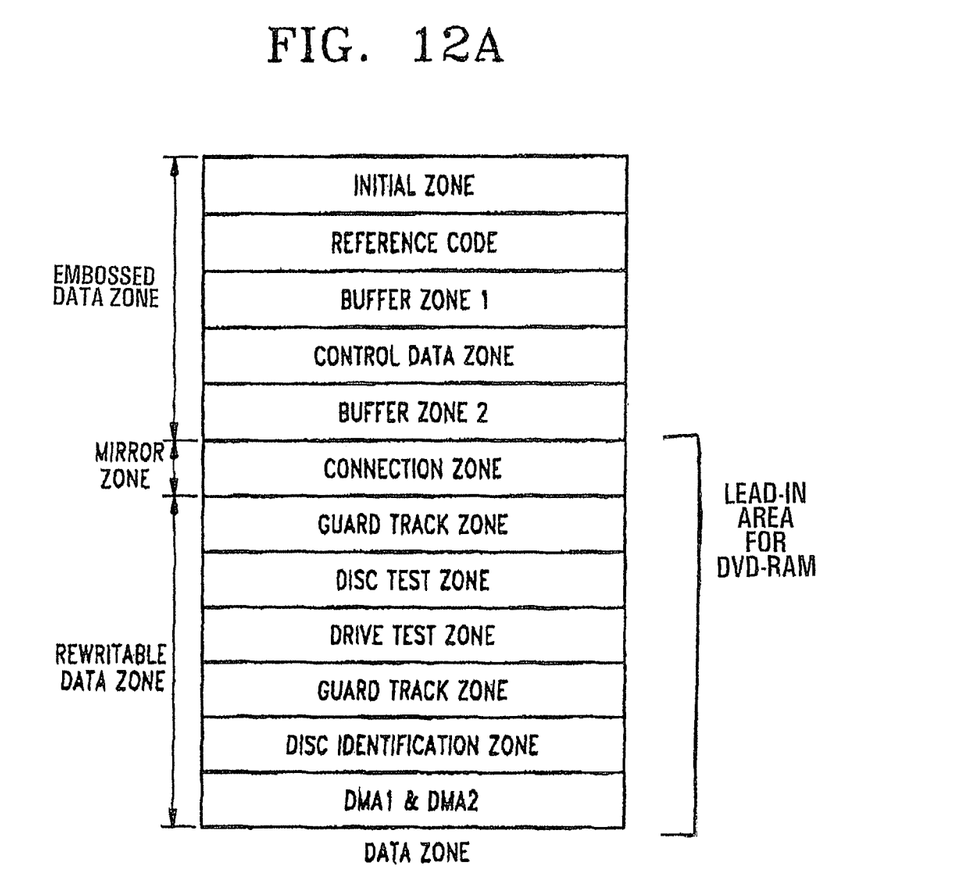
FIGS. 12A and 12B are diagrams showing an information structure of a lead-in area on an optical recording medium having a writable specification and an information structure of a lead-in area on an optical recording medium having a read-only specification, respectively, for clear understanding of the present invention.
Figure 12B:
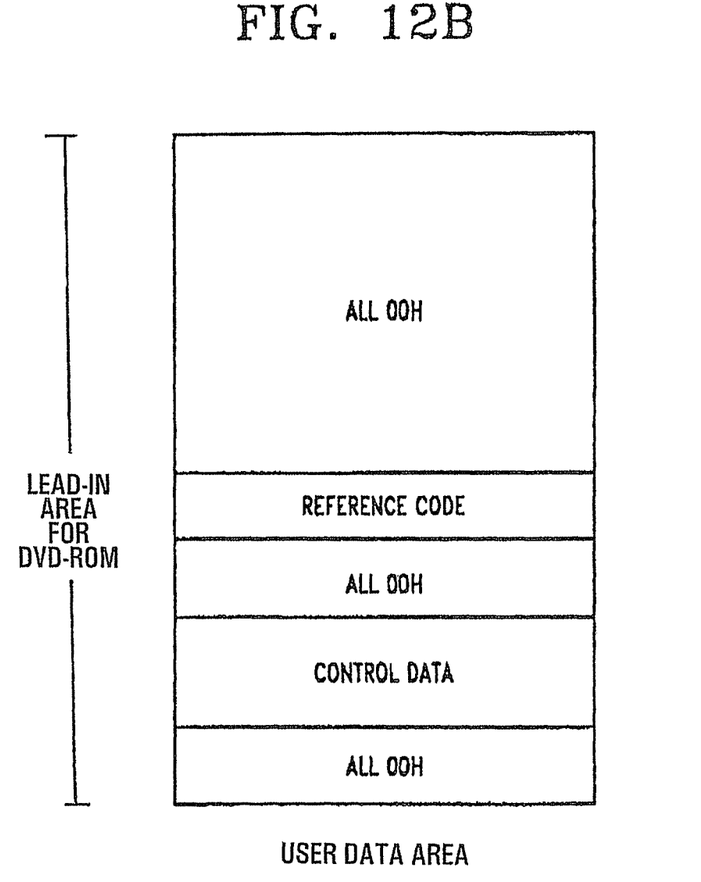

As shown in FIG. 12A, a DVD-RAM, which has a writable format, has the same information structure of an embossed data zone having pits in the lead-in area as that of a DVD-ROM shown in FIG. 12B. In other words, a reference code, a buffer zone, an initial zone and the like are the same in terms of size and data value between the two information structures. The only difference between the two information structures lies in that a portion of information of the control data zone is different. This minor difference means that the two lead-in areas can be integrated with the identical information.

If the information of the two lead-in areas is integrated into the lead-in information for the read-only storage region, it is sufficient for the lead-in area of the writable storage area to only include a connection zone for connecting the read-only storage area and the writable storage area, defect management zones DMA 1 and DMA 2, and a drive test zone.

The rewritable lead-in area is located in the writable storage area, and the connection zone is a mirror zone formed of a reflective layer without including any information, which is effective in minimizing the unnecessary space between the read-only storage area and the writable storage area.

Figure 13:
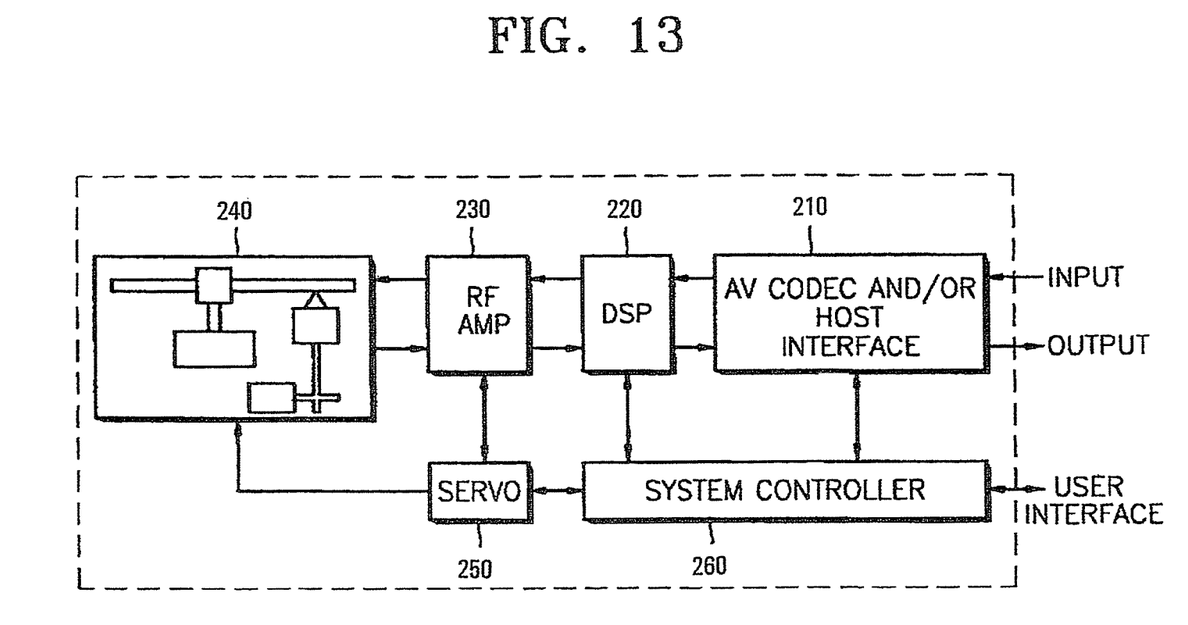
FIG. 13 is a block diagram of a recording/reproducing apparatus using an optical recording medium according to embodiments of the present invention.

FIG. 13 is a block diagram of an apparatus for recording/reproducing information onto/from the optical recording medium according to the embodiments of the present invention.

For a writing operation, an AV CODEC and/or host interface 210 compresses an A/V signal from the outside according to a predetermined compression scheme, and outputs information on the size of the compressed A/V data. A digital signal processor (DSP) 220 receives the compressed A/V data from the AV CODEC and/or host interface 210, adds additional information to the received compressed A/V data for error correction coding (ECC), and modulates the data according to a predetermined modulation scheme. A radio frequency amplifier (RF AMP) 230 converts the data modulated by the DSP 220 into an RF signal. A pickup unit 240 writes the RF signal from the RF AMP 230 onto the writable storage area of a disc (any of the hybrid discs 40, 60, 70, 90, 110 and 130 disclosed herein) mounted on a turntable. A servo unit 250 receives information required for servo control from a system controller 260, and stably servo controls the disc.

The system controller 260 generates identification information for indicating a hybrid disc having a read-only storage area and a writable storage area, and controls the apparatus to write the identification information onto the lead-in area of the read-only storage area through the DSP 220 and the RF AMP 230.

On the other hand, for a reading operation, the pickup unit 240 picks up the data, which is in the form of an optical signal, from a hybrid disc having a read-only storage area and a writable storage area, and outputs an electrical signal. The RF AMP 230 extracts a servo signal for use in servo controlling and the modulated data. The DSP 220 demodulates the modulated data from the RF AMP 230 based on the modulation scheme used for the previous modulation, corrects errors through ECC, and removes the data added for the ECC. The servo unit 250 receives information required for servo controlling from the RF AMP 130 and the system controller 260, and performs servo controlling. The AV CODEC and/or host interface 210 decompresses the compressed A/V data from the DSP 220 to output the original A/V signal. The system controller 260 controls the entire system for reading and writing information data from and to the hybrid disc seated on the turntable by user interfacing.

A problem of hybrid discs having a read-only storage area in a DVD-ROM format and a writable storage area in a DVD-RAM format is that a reference linear velocity is different for each area. Especially, a change in reference linear velocity for the writable storage area varies the recording characteristics, and thus data cannot be recorded on the area. On the other hand, as can be seen from an existing multiple speed reproducing system for DVD-ROMs, data can be reproduced from the read-only storage area at variable reproduction speeds, without causing any serious problem.

In the apparatus for alternately and repeatedly reproducing or recording data from or onto the read-only storage area and the writable storage area, respectively, it is preferable that the servo unit 250 reproduces the data from the read-only storage area at the same reference velocity as the reference linear velocity for recording and reproducing the data at the innermost part of the writable storage area.

As previously described, the present invention provides an optical recording medium having composite recording/reproducing characteristics, in which both a read-only storage area in the existing DVD-ROM format, and a writable storage area having the recording/reproducing characteristics defined by a DVD-RAM format are present on an optical recording medium such as a hybrid disc. In the hybrid disc according to the embodiments of the present invention, data correction, modification and addition of data stored in the read-only storage area is possible, using the writable storage area. In addition, the hybrid disc can be efficiently manufactured by various methods according to the present invention.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of reproducing a multi-layered optical information storage medium, the method comprising:
    providing the multi-layered optical information storage medium;
    reading, by a pickup of a reproducing apparatus, at least one of first information and second information recorded on the multi-layered optical information storage medium comprising a first storage layer comprising a first lead-in area having the first information; and a second storage layer comprising a second lead-in area having the second information,
    the first information comprising:
        physical format information for both the first storage layer and the second storage layer indicating whether the first storage layer and the second storage layer are read-only or recordable, the physical format information of the first information comprising information indicating a book type that the first storage layer conforms to; and
        hybrid identification information indicating whether an additional storage layer exists in the multi-layered optical information storage medium, the additional storage layer being reproducible by a second laser different from a first laser, the first laser being used to reproduce the first and second storage layers; and
    the second information comprising:
        the physical format information for both the first storage layer and the second storage layer indicating whether the first storage layer and the second storage layer are read-only or recordable, the physical format information of the second information comprising information indicating a book type that the second storage layer conforms to; and
        the hybrid identification information indicating whether the additional storage layer exists in the multi-layered optical information storage medium; and
    determining, by a controller of the reproducing apparatus, whether the first storage layer and the second storage layer are read-only or recordable, or whether the additional storage layer exists in the multi-layered optical information storage medium, based on the at least one of the first information and the second information.

2. The method of claim 1, wherein the first storage layer is a read-only storage layer, and the second storage layer is a recordable storage layer.

3. The method of claim 1, wherein a wavelength of the second laser is longer than a wavelength of the first laser.

4. The method of claim 1, wherein the first storage layer is a read-only storage layer, the second storage layer is a recordable storage layer, and a wavelength of the second laser is longer than a wavelength of the first laser.

* * * * *